United States Patent [19]

Billings

[11] 3,855,327

[45] Dec. 17, 1974

[54] HYDROGENATION OF UNSATURATED COMPOUNDS

[75] Inventor: William G. Billings, Bartlesville, Okla.

[73] Assignee: Phillips Petroleum Company, Bartlesville, Okla.

[22] Filed: July 8, 1971

[21] Appl. No.: 160,886

[52] U.S. Cl...... 260/668 D, 260/666 A, 260/668 R, 260/673.5
[51] Int. Cl............................ C07c 5/18, C07c 5/04
[58] Field of Search............ 260/666 A, 667, 683.9, 260/668 D, 673.5

[56] References Cited
UNITED STATES PATENTS
3,277,095   10/1966   Blanchard et al.................. 260/270
3,546,307   12/1970   Tabler............................ 260/666 A Primary Examiner—C. Davis

[57] ABSTRACT

Unsaturated hydrocarbons are hydrogenated with a pyridine-organocopper product produced by reaction of halide, pyridine, and a weak organic acid in the presence of carbon monoxide. Specific unsaturated hydrocarbons are ethylene, propylene, butenes, pentenes, cyclopentene, cyclohexene, butadiene, etc.

The hydrogenation can be in gas phase or in liquid phase. Diluent can be used with pressure sufficient to keep reactants in solution.

5 Claims, No Drawings

HYDROGENATION OF UNSATURATED COMPOUNDS

This invention relates to hydrogenation of unsaturated hydrocarbons. It also relates to the use of a pyridine-organocopper product as a catalyst, said product having been prepared by reaction of cuprous halide, pyridine, and a weak organic acid in the presence of carbon monoxide.

In one of its concepts the invention relates to the hydrogenation of unsaturated hydrocarbons such as ethylene, propylene, butenes, pentenes, cyclopentene, cyclohexene, butadiene, etc., to their corresponding saturated or more saturated counterparts.

In another of its concepts the invention relates to the production of more saturated hydrocarbons from less saturated hydrocarbons by hydrogenation of said compounds in the presence of a catalyst as herein described which can be supported on carbon, silica, alumina, silica-alumina, kieselguhr, titania, boria, etc. In a further concept of the invention the pyridine-organocopper catalyst is dissolved in an amine such as pyridine and the support is impregnated with the solution following which the hydrogenation operation is conducted.

I have now discovered that a catalyst as herein described which is a pyridine-organocopper catalyst can be used effectively to hydrogenate unsaturated hydrocarbons to more saturated ones. The hydrocarbons are generally termed olefins or cycloolefins.

It is an object of this invention to hydrogenate unsaturated hydrocarbons to more saturated hydrocarbons. It is another object of this invention to produce ethylcyclohexene and ethylbenzene from 4-vinylcyclohexene-1.

Other aspects, concepts and several advantages of this invention are apparent from a study of this disclosure and the appended claims.

According to the present invention an organocopper product prepared from cuprous halide, pyridine, and a weak organic acid which are reacted in the presence of carbon monoxide is employed to hydrogenate an unsaturated hydrocarbon to a more saturated hydrocarbon.

The hydrogenation operating conditions are: temperature of about 400° to about 700°F., preferably from about 500° to about 650°F.; hydrogen pressure from about 15 to about 600 psig, preferably from about 25 to 150 psig; time in hours from about 0.1 to about 3, preferably from about 0.5 to about 2, and liquid hourly space velocity of from about 0.2 to about 2, preferably 0.5 to about 1.

The pyridine-organocopper catalyst can be dissolved in an amine such as pyridine and the support impregnated with the solution. The catalyst or the supporter catalyst ordinarily will consist of particles which pass through a U.S. Mesh No. 100 sieve and more preferably U.S. Mesh No. 200 sieve.

The catalyst employed in this invention is disclosed and claimed along with its method of preparation in Ser. No. 845,525 filed July 28, 1969, now U.S. Pat. No. 3,712,894 issued Jan. 23, 1973, by me. The disclosure of that application for patent is incorporated herein by reference. There follow examples and discussion related to the catalyst and its preparation.

EXAMPLE I

A mixture of 5.0 gm of cuprous chloride, 20 ml of pyridine and 90 ml of nitromethane was prepared and charged to 500 ml reactor fitted to Parr reaction apparatus. The atmosphere was purged of air, then charged with carbon monoxide to 30 psig at room temperature and agitated for 30 minutes. During this time the mixture absorbed 48.5 millimoles of carbon monoxide. The pressure of carbon monoxide was lowered to 5 psig and allowed to stand for 48 hours. Carbon monoxide was evolved during this period and the organocopper product precipitated from solution. The product was separated from the mixture by filtration and thoroughly washed with hot cyclohexane. 12.2 grams (50 percent yield based on copper) of dried product were isolated. The compound has a melt point of 245° – 250°C. and gave the following elemental analysis.

|    | %    |
|----|------|
| C  | 38.8 |
| H  | 3.1  |
| N  | 10.2 |
| O  | 4.2  |
| Cu | 22   |
| Cl | 22.5 |

Thus, the data indicated the presence of a structure such as:

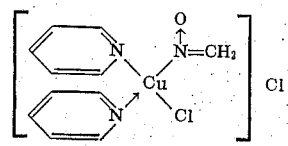

EXAMPLE II 50 ml of 2,4-pentanedione, 10 ml of pyridine and 5.0 grams of cuprous chloride were charged to a 500 ml pressure reactor. A carbon monoxide atmosphere was then introduced and maintained at 30 psig as the reactor was shaken at room temperature. 43.2 millimoles of carbon monoxide was absorbed during this period. The pressure was then lowered to one atmosphere and the reactor shaken until carbon monoxide was no longer evolved. A crystalline blue solid was then separated by filtration and washed with hot cyclohexane. Elemental analysis and infrared spectroscopy indicated the presence of a structure such as:

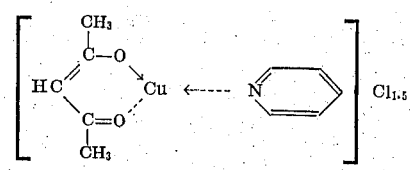

The elemental analysis of the product was:

|   | %    |
|---|------|
| C | 42.8 |
| H | 3.9  |

-Continued

| | % |
|---|---|
| N | 5.0 |
| O | 9.7 |
| Cu | 22 |
| Cl | 16.7 |

Generally, the complexes are solid and crystalline, but are not always blue in color.

The pyridine compounds which are applicable for use in preparing the catalyst used in the present invention include pyridine and pyridine derivatives such as pyridines substituted with hydrocarbon radicals, cyano groups, nitro groups, halogen atoms, and the like. A suitable class of such pyridine compounds is represented by the formula:

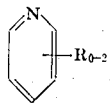

wherein each R is an alkyl or alkenyl hydrocarbon radical having up to about 15 carbon atoms or a nitro, cyano, or halo group.

Some specific examples are pyridine, 4-vinylpyridine, 3-methylpyridine, 3-cyanopyridine, 3,5-dinitropyridine, 4-chloropyridine, 3,4-difluoropyridine, 3,5-pentadecylpyridine, and the like, and mixtures thereof.

The weak organic acids which are applicable to prepare the catalyst used in the present invention are those noncarboxylic organic compounds whose acidity is derived from the presence of electron-withdrawing groups within the molecule. Some suitable classes of such weak acids are represented by the formulas:

$$R' - CH_2 - Z \text{ and } R' - Y - CH_2 - Y - R'$$

wherein each $R'$ is hydrogen or R; each Z is selected from $NO_2$, $CN$, $CO_2R$, $COH$, $CONH_2$, $CONRH$, $CONR_2$, $COSR$, $CSOR$, $CNHNH_2$, $CXH_2$, $CX_2H$, and $CX_3$; each Y is selected from

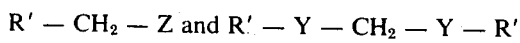

wherein each X is a halogen; each A is selected from $CN$, $NO_2$, $COR$, $COH$, $CO_2R$, $CONH_2$, $CONRH$, $CONR_2$, $COSR$, $CSOR$, X or hydrogen, at least one A being other than hydrogen.

Some specific examples of these are nitromethane, nitroethane, 1-nitropropane, butyronitrile, methyldodecylketone, 4-methylheptaldehyde, ethylhexanoate, lauramide, N-methylacetamide, N,N-diethylpropionamide, isobutyl thiolacetate, methyl thionbutyrate, propylhydrazine, 1bromopropane, 1,1-dichloropentane, 1,1,1-difluoro-4-methylpentadecane, 2,4-pentanedione, 2,4-hexanedione, 3,5-octanedione, diethyl malonate, 2,4-dinitropentane, 3,5-dycyanononane 3-chlorobutyral, malonamide, 3-bromobutyronitrile, N-methylmalonamide, 3,3,5,5-tetrachloroheptane, and the like, and mixtures thereof.

Particularly applicable are weak acids such as nitromethane, 2,4-pentanedione, 1-nitropropane, ethyl acetoacetate, chlorophenylmethane, benzylcyanide, and the like.

The applicable cuprous halides are cuprous chloride, bromide, fluoride, or iodide, preferably chloride.

Usually, from about 1 to about 4 moles of pyridine and from about 2 to about 20 moles of the weak organic acid are employed for each mole of copper. Larger proportions of these two reactants can be used even to the point of serving as the reaction medium. It is particularly convenient to use the weak acid component as the medium. Otherwise, other inert nonaqueous liquids in which the reactants are at least partially soluble can be used as the medium.

The reaction is carried out in an atmosphere of CO and in the substantial absence of free oxygen. A CO pressure of 1–10 atmospheres, preferably 1–2.5 atmospheres is generally used. The contact is continued under reaction conditions for a period of from about 1 to about 80 hours, more generally from about 1 to about 24 hours at a temperature in the range of from about −30 to about 80°C., preferably from about 20° to about 50°C.

In the latter portion of the reaction period, the reaction is assisted by allowing the carbonyl-containing intermediate product, which is believed to have formed, to decompose. This is conveniently done by reducing the CO pressure in the reaction vessel and allowing the CO to leave the liquid reaction medium. As the pressure is reduced the CO escapes, the desired product is formed and precipitates from solution. Thus, the formation of the final product can be controlled by the CO pressure in the final portion of the reaction period. Warming and agitation can also be used to promote this CO evolution.

Some heat is evolved during the early stages of the reaction period during which the CO is believed to be absorbed. Some cooling may be required at that time.

Although some complexes of copper require careful control of the pH levels by the use of buffer mixtures for their preparation, the present products and process are not sensitive in this respect and do not require buffers. Still another advantage is that the use of the reducing atmosphere of CO prevents undesired oxidative side reactions such as those frequently encountered when preparing nitro group-containing metal complexes.

After the reaction period, the product is isolated and recovered by conventional methods. The product is generally in the form of a solid precipitate and can be separated by decantation or filtration, washed to free it from by products by any convenient solvents such as hydrocarbons, and further purified by recrystallization or other methods as desired.

The hydrogenation of the olefins or cycloolefins by contact with hydrogen in the presence of the catalyst as herein described can be effected either continuously or batchwise. Further, the operation can be effected either in the gas phase or in the liquid phase. Liquid phase reaction conditions can be obtained in the presence of a diluent under conditions of temperature and pressure suited to maintain reactants in solution. The solution can contain diluents which are unsaturated compounds which can be readily separated from the reaction product. Examples of such diluents are pentanes, octanes, cyclohexane, etc.

The hydrogen can be added as is customary in hydrogenation operations and can be fed to the reaction either continuously or intermittently to maintain a desired pressure thereof.

EXAMPLE III

A compound promoting hydrogenation, dehydrogenation and/or transhydrogenation activity was prepared by adding 50 millimoles of carbon monoxide under 35 psi with shaking to a mixture of 5 gms. of cuprous chloride in 10 mls. of pyridine and 100 mls. nitromethane. The mixture was allowed to set 48 hours at ambient temperature and the resulting crystals separated by filtration.

One gram of crystals of the above named compound was added to 50 mls. of 4-vinylcyclohexene-1 in a 200 ml. pressure reactor. The reactor was loaded with 100 psi hydrogen and heated to 630°F for 30 minutes. Analysis of the reaction product by v.p.c. (vapor phase chromatography) and mass spectrometer showed approximately equal molar amounts of vinylcyclohexene, ethylcyclohexene and ethylbenzene. The reaction can be depicted as shown:

Reasonable variation and modification are possible within the scope of the foregoing disclosure and the appended claims to the invention, the essence of which is that a pyridine-organocopper product produced as herein described, and supported as herein described when it is supported, is useful for hydrogenation and transhydrogenation as well as dehydrogenation of hydrocarbons.

I claim:

1. A process for converting 4-vinylcyclohexene-1 to ethylcyclohexene and ethylbenzene which comprises contacting same with hydrogen in the presence of a pyridine-organocopper catalyst product which is a solid crystalline precipitate separated from the reaction product obtained by reacting cuprous halide, pyridine, and a weak organic acid in the presence of carbon monoxide.

2. The conversion of 4-vinylcyclohexene-1 to ethylcyclohexene and ethylbenzene, according to the process of claim 1, wherein the catalyst is prepared from cuprous chloride, pyridine and nitromethane.

3. A process according to claim 1 wherein said contacting is effected at a temperature in the range of 400°–700°F and at a hydrogen pressure of 15–600 psig.

4. A process according to claim 1 wherein said catalyst product is supported on carbon, silica, alumina, silica-alumina, kieselguhr, titania, or boria.

5. A process according to claim 1 wherein the 4-vinylcyclohexene-1 is diluted with a diluent.

* * * * *